United States Patent
Komeda et al.

(10) Patent No.: US 6,976,934 B2
(45) Date of Patent: Dec. 20, 2005

(54) SHIFT CONTROL SYSTEM FOR HYBRID VEHICLES

(75) Inventors: Osamu Komeda, Mishima (JP); Shizuo Sasaki, San Antonio, TX (US); Yoshiki Hashimoto, Suntou-gun (JP); Hiroki Murata, Gotenba (JP); Yuichiro Kitamura, Anjo (JP); Yoshihide Suzuki, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 10/705,475

(22) Filed: Nov. 12, 2003

(65) Prior Publication Data

US 2004/0147365 A1 Jul. 29, 2004

(30) Foreign Application Priority Data

Nov. 21, 2002 (JP) ............................. 2002-337745

(51) Int. Cl.$^7$ ........................... B60K 41/02; B60K 1/00
(52) U.S. Cl. ........................................ 477/5; 180/65.4
(58) Field of Search ................. 477/35; 180/65.3–65.4

(56) References Cited

U.S. PATENT DOCUMENTS

| | | | | |
|---|---|---|---|---|
| 5,722,502 A | * | 3/1998 | Kubo | 180/65.4 |
| 5,842,534 A | * | 12/1998 | Frank | 180/65.2 |
| 5,993,351 A | * | 11/1999 | Deguchi et al. | 477/5 |
| 6,083,138 A | * | 7/2000 | Aoyama et al. | 477/5 |
| 6,159,127 A | * | 12/2000 | Loeffler et al. | 477/5 |
| 6,428,444 B1 | * | 8/2002 | Tabata | 477/3 |
| 6,554,736 B2 | * | 4/2003 | Takano et al. | 477/5 |
| 6,722,230 B2 | * | 4/2004 | Sakamoto et al. | 477/3 |
| 2002/0061803 A1 | * | 5/2002 | Aoki | 477/3 |
| 2004/0009842 A1 | * | 1/2004 | Inada | 477/5 |

FOREIGN PATENT DOCUMENTS

| | | |
|---|---|---|
| JP | A 11-141665 | 5/1999 |
| JP | A 2000-45815 | 2/2000 |
| JP | A 2000-272360 | 10/2000 |
| JP | A 2002-89594 | 3/2002 |
| JP | A 2002-526326 | 8/2002 |
| JP | A 2003-146095 | 5/2003 |
| JP | A 2003-165361 | 6/2003 |

* cited by examiner

Primary Examiner—Roger Pang
(74) Attorney, Agent, or Firm—Oliff & Berridge, PLC (57) ABSTRACT

A shift control system for hybrid vehicles which is constructed to transmit a motive energy of the prime mover to a wheel via a clutch and a transmission, comprises an electric power generating means for generating an electric power by the motive energy of the prime mover, and for supplying the generated electric power to an electric motor, when executing a gear shift of the transmission and transmitting the motive energy of the motor to the wheel.

12 Claims, 5 Drawing Sheets

SHIFT CONTROL SYSTEM FOR HYBRID VEHICLES

BACKGROUND OF THE INVENTION

1. Field of the Invention

The present invention relates to a system for controlling a gear shift of a transmission in a hybrid vehicle which is provided with an electric motor in addition to an internal combustion engine or the like as a prime mover, and more specifically, to a shift control system intended for the hybrid vehicle which is constructed to transmit a motive energy of the motor to a wheel when a gear shift is executed.

2. Related Art

In the vehicle, which is provided with a clutch and a transmission between an engine and wheels, a control for lowering a torque capacity of a clutch at a shifting time of the transmission is known in the prior art. When the torque capacity of the clutch is thus lowered at the shifting time of the transmission, however, there is a problem such that a driving torque or an acceleration is fluctuated due to lowering of the torque to be transmitted to the wheels. In this connection, a technology which is capable of suppress the lowering of the torque or the acceleration even if the torque capacity of the clutch is lowered at the shifting time of the transmission is known, and one example of such technology is disclosed in Japanese Patent Laid-Open No. 11-141665.

According to the vehicle as disclosed in Japanese Patent Laid-Open No. 11-141665, it is constructed to transmit a motive energy of the engine to the transmission through the clutch. The transmission has an input shaft and an output shaft, and the input shaft is connected to the clutch and the output shaft is connected to the wheel through differential gears. Also, a motor is connected to the input shaft or the output shaft. Moreover, it is constructed to supply an electric power of a battery to the motor through a controller. The clutch is released at the shifting time of the transmission and the output shaft is driven by supplying an electric current to the motor, thereby to maintain the acceleration feeling. Besides, a technology for transmitting the motive energy of the motor to the wheel when the clutch is released is also disclosed in Japanese Patent Laid-Open No. 2002-89594, other than aforementioned Japanese Patent Laid-Open No. 11-141665.

However, there is a problem such that an electric power source such as a battery for supplying the electric power to the motor has to grow in its capacity and in its size, if the control takes place to compensate the lowering of the torque to be transmitted to the wheels with an output torque of the motor by means of driving the motor with the electric power of the battery when the clutch is released, as disclosed in Japanese Patent Laid-Open No. 11-141665.

SUMMARY OF THE INVENTION

A main object of the present invention is to suppress the growing of the electric power source for supplying the electric power to the electric motor in its size and capacity, in the vehicle which is constructed to assist the driving torque by the electric motor at the shifting time.

The shift control system according to the present invention comprises an electric power generator driven by the prime mover such as the internal combustion engine, and it is constructed to assist the driving torque by means of driving the electric motor with the electric power, which is generated by driving the electric power generator with the motive energy of the prime mover, when lowering a torque capacity of a clutch mechanism arranged between the prime mover and the transmission at the shifting time of the transmission. Accordingly, the electric power to be used for assisting the torque at the shifting time is the electric power generated from the electric power generator, so that a heavy load is not applied to an electric accumulator such as a battery. Therefore, the battery or the electric accumulator may be lowered in its capacity or downsized. Besides, the driving torque is assisted by the electric motor so that occurring of a shock at the shifting time is prevented or suppressed.

Since the electric power generator is driven by the prime mover at the shifting time and absorbs the output torque of the prime mover, the torque to be inputted to the transmission from the prime mover through the clutch is lowered. Therefore, the gear shift may be executed smoothly even in case of executing the gear shift by a shifting of a synchronizing mechanism or the like.

It is preferable to absorb an entire torque outputted from the prime mover at the shifting time by the electric power generator. In case that the entire torque outputted from the prime mover cannot be absorbed by the electric power generator, the prime mover is controlled so as to lower the output torque at the shifting time. Accordingly, so-called torsional torque does not act on the transmission at the shifting time so that the shift shock may be prevented or suppressed.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

DETAILED DESCRIPTION OF THE PREFERRED EMBODIMENTS

Figure 2:
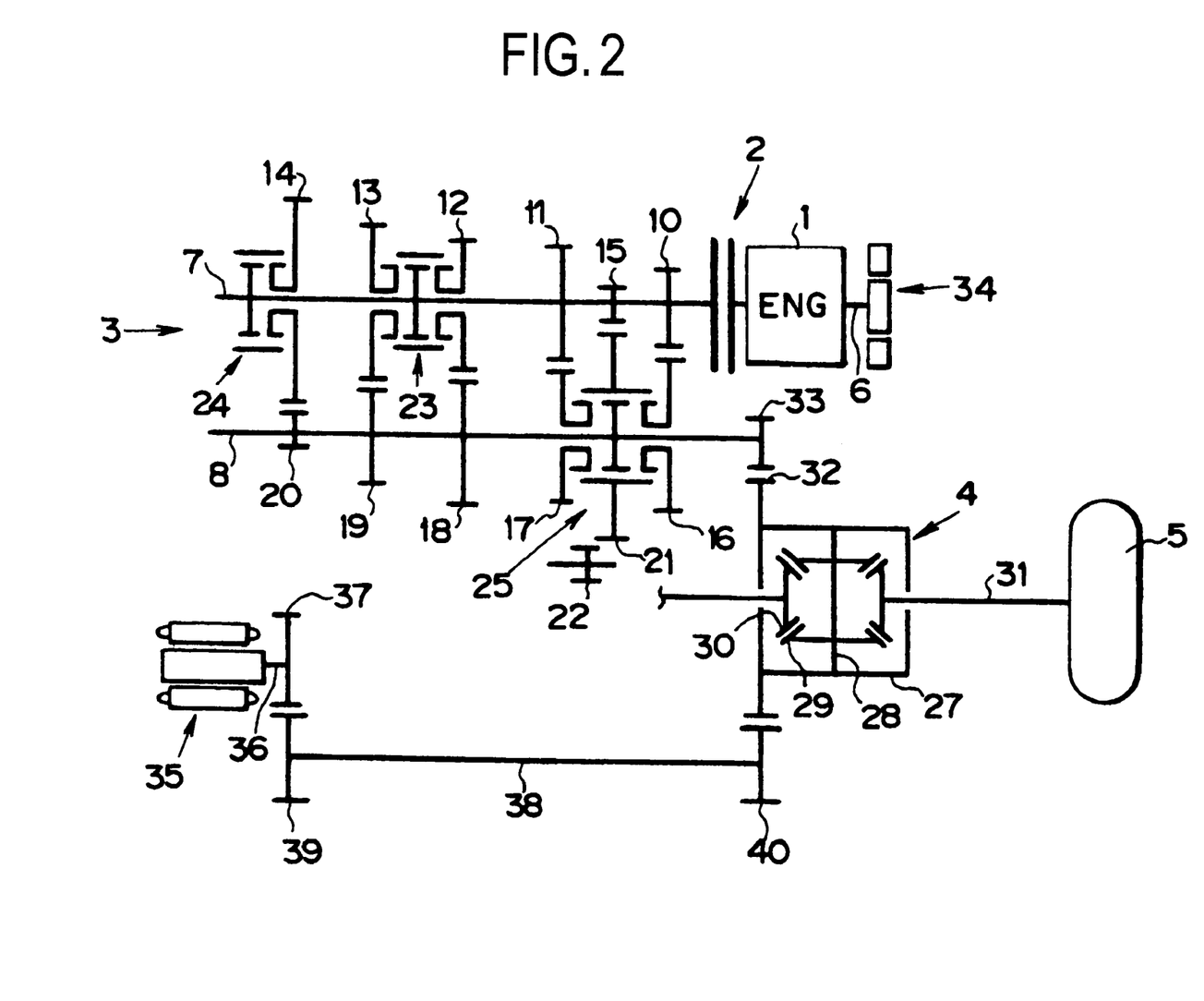
FIG. 2 is a schematic diagram showing a power train of a hybrid vehicle in which the control example in FIG. 1 is applicable.
Figure 3:
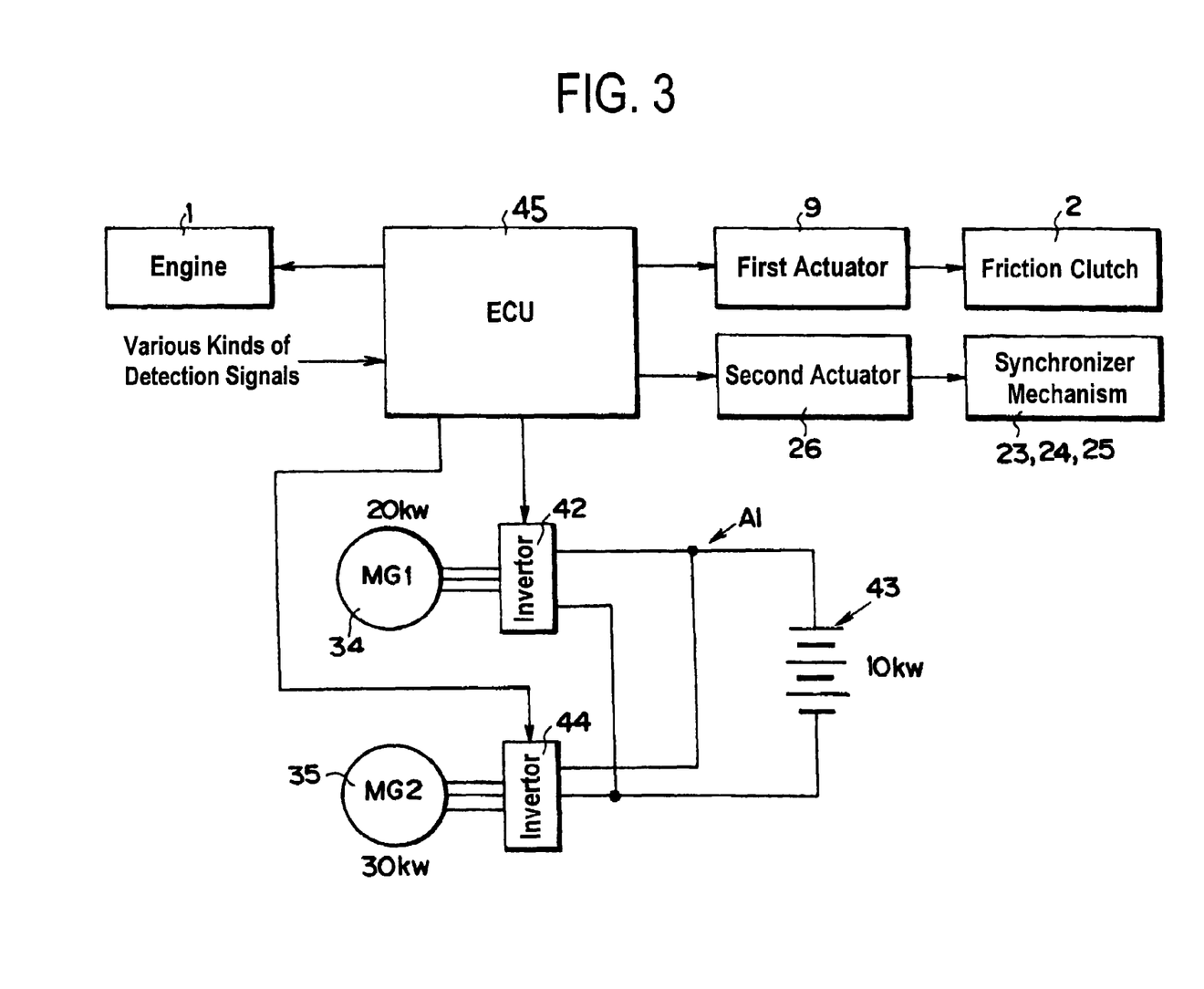
FIG. 3 is a schematic diagram showing a control system and an electric system of the vehicle as shown in FIG. 2.

Next, this invention will be described with reference to a specific embodiment. One embodiment of a power train of a vehicle (a hybrid vehicle) Ve in which the present invention is applied is shown in FIG. 2, and a control system and an electric system of the vehicle Ve are shown in FIG. 3. According to the power train shown in FIG. 2, it is constructed to transmit a torque of a prime mover 1 to a wheel (front wheel) 5 through a clutch 2, a transmission 3, and a differential 4. The clutch 2 is constructed of a friction clutch, an electromagnetic clutch, a powder clutch and so on. The prime mover 1 is constructed of an internal combustion engine for example, and specifically, any of a gasoline engine, a diesel engine, a LPG engine or the like. Hereinafter, a case in which the gasoline engine is employed as the prime mover 1 will be described, and the prime mover 1 is called as an "engine 1" for the sake of convenience.

This engine 1 has a crankshaft 6, and the transmission 3 has an input shaft 7 and an output shaft 8. The clutch 2 controls a power transmitting condition between the crankshaft 6 and the input shaft 7, and there is provided a first actuating mechanism 9 for engaging/releasing the clutch 2 and for controlling its torque capacity.

On the other hand, the input shaft 7 and the output shaft 8 are parallel to each other and arranged in the width direction of the vehicle Ve (in the horizontal direction). A first speed drive gear 10, a second speed drive gear 11, a third speed drive gear 12, a fourth speed drive gear 13, a fifth speed drive gear 14, and a reverse drive gear 15 are arranged in an outer circumferential side of the input shaft 7. Here, the first speed drive gear 10, the second speed drive gear 11, and the reverse drive gear 15 are installed on the input shaft 7 so as to rotate integrally with the input shaft 7. On the contrary, the third speed drive gear 12, the fourth speed drive gear 13, and the fifth speed drive gear 14 are installed on the input shaft 7 through a bearing (not shown) so as to rotate relatively to the input shaft 7.

On the other hand, a first speed driven gear 16, a second speed driven gear 17, a third speed driven gear 18, a fourth speed driven gear 19, a fifth speed driven gear 20, and a reverse driven gear 21 are arranged in an outer circumferential side of the output shaft 8. Here, the third speed driven gear 18, the fourth speed driven gear 19, and the fifth speed driven gear 20 are installed on the output shaft 8 so as to rotate integrally with the output shaft 8. On the contrary, the first speed driven gear 16, the second speed driven gear 17, and the reverse driven gear 21 are installed on the output shaft 8 through a bearing (not shown) so as to rotate relatively to the output shaft 8.

The first speed drive gear 10 and the first speed driven gear 16 are engaged each other, and the second speed drive gear 11 and the second speed driven gear 17 are engaged each other. Also, the third speed drive gear 12 and the third speed driven gear 18 are engaged each other, and the fourth speed drive gear 13 and the fourth speed driven gear 19 are engaged each other. Moreover, the fifth speed drive gear 14 and the fifth speed driven gear 20 are engaged each other. Furthermore, there is provided an intermediate gear 22 which rotates around an axis in parallel with the input shaft 7 and the output shaft 8, and the intermediate gear 22 is engaged with the reverse drive gear 15.

Each of aforementioned pair of gears engaged each other sets predetermined gear stage individually, and there is provided a plurality of synchronous engaging mechanism (synchronizer) for engaging those pairs of gears with the input shaft 7 or the output shaft 8 selectively. Namely, there is provided a synchronizing mechanism 23 for engaging the third speed drive gear 12 or the fourth speed drive gear 13 selectively with the input shaft 7. Also, there is provided a synchronizing mechanism 24 for engaging the fifth speed drive gear 14 selectively with the input shaft 7. Moreover, there is provided a synchronizing mechanism 25 for engaging the first speed driven gear 16 or the second speed driven gear 17 selectively with the input shaft 8.

A construction of those synchronizing mechanisms 23, 24, and 25 is not shown in detail in the figures, but similar to that of synchronizers known in prior art. Namely, a sleeve movable in the axial direction is splined to a hub which rotates integrally with the input shaft 7 or the output shaft 8, and it is constructed to engage the sleeve with the spline which is integrated with an abutting gear, by means of moving the sleeve in the axial direction. The synchronizing mechanism 25 for engaging the first speed driven gear 16 or the second speed driven gear 17 selectively with the input shaft 8 is constructed so that the sleeve and the reverse driven gear 21 rotates integrally, and that a reverse stage is set by means of moving the reverse driven gear 21 in the axial direction to engage selectively with the intermediate gear 22.

Also, there is provided a second actuating mechanism 26 for operating synchronizing mechanisms 23, 24, and 25 individually.

On the other hand, the differential 4 comprises a differential gear casing 27, a pair of pinion gears 29 fitted to the differential gear casing 27 through a pinion shaft 28, and a pair of side gears 30 engaged with those pinion gears 29. A drive shaft 31 for transmitting the torque from the side gear 30 to the wheel 5 is connected with the side gear 30. Moreover, there is provided a ring gear 32 in the differential gear casing 27. Furthermore, a gear 33 provided on the output shaft 8 is engaged with the ring gear 32.

Moreover, a first motor generator 34 is connected with the crank shaft 6 of the engine 1 in a power transmittable condition. This first motor generator 34 corresponds to the electric power generator of the present invention, and is connected with the engine 1 closer than the clutch 2. Aside from this, there is provided a second motor generator 35, and an output shaft 36 of the second motor generator 35 is provided with a gear 37. This second motor generator 35 corresponds to the electric power generator of the present invention, and assists the driving torque. A mechanism for assisting the driving torque will be described hereafter. There is provided a power transmission shaft 38, and gears 39 and 40 are arranged thereon. The gear 37 provided on the output shaft 36 of the second motor generator 35 and the gear 39 are engaged with each other, and another gear 40 and the ring gear 32 are engaged with each other.

Next, the electric system in the aforementioned vehicle Ve will be described hereinafter. The first motor generator 34 and the second motor generator 35 have not only a powering function for converting an electric energy into a motive energy, but also a regenerating function for converting a motive energy into an electric energy. In this embodiment, there will be described the case in which a three phase alternating current motor generator is employed as the first motor generator 34 and the second motor generator 35. A battery 43 is connected with the first motor generator 34 through an inverter 42, and the second motor generator 35 is connected with the battery 43 through another inverter 44. Accordingly, the first motor generator 34 and the second motor generator 35 are connected with the battery 43 in parallel with each other.

There is provided an electric circuit Al having aforementioned inverters 42, 44, and the battery 43, which is constructed to execute a control described below. First of all, the second motor generator 35 is supplied with the electric power of the battery 43 and driven as the motor. Also, the electric circuit Al makes the first motor generator 34 function as the electric power generator, and charges the battery 43 with a generated electric power. Moreover, the electric circuit A1 supplies the electric power generated from the first motor generator 34 to the second motor generator 35 with or without going through the battery 43.

Moreover, the control system of the vehicle Ve will be described hereinafter. Firstly, there is provided an electronic control unit (ECU) 45 for controlling the vehicle Ve entirely. This electronic control unit 45 corresponds to the controller of the present invention, and it comprises a microcomputer which is composed mainly of a processor (CPU or MPU), a storage unit (RAM or ROM), and an input/output interface. Detection signals of an acceleration demand (e.g., accelerator opening), breaking demand, a shift position, a vehicle speed, a throttle opening, an engine speed, a charging amount of the battery, a number of revolution of the input shaft 7 of the transmission 3 and so on are inputted into the electronic control unit 45. On the other hand, a signal for controlling an output of the engine, a signal for controlling the first actuator 9 and the second actuator 26, a signal for controlling inverters 42, 44 and so on are outputted from the electronic control unit 45.

For example, a driving command signal of the engine 1 is outputted based on the signal to be inputted into the electronic control unit 45 and a data stored in the electronic control unit 45, and the engine 1 is thereby driven. Under such conditions, the torque capacity of the clutch 2 is increased and the output torque of the engine 1 is transmitted to the input shaft 7 of the transmission 3. The electronic control unit 45 executes a gear shift decision of the transmission 3 in accordance with the signals of the shift position, the vehicle speed, the acceleration demand and so on, and the control signal is outputted to the first actuator 9 and the second actuator 26 in accordance with the decision result.

Specifically, in case that a forward position is selected, when the first speed is set by means of engaging the first speed driven gear 16 with the output shaft 8 with operating the synchronizing mechanism 25, the torque of the input shaft 7 is transmitted to the output shaft 8 through the first speed drive gear 10 and the first speed driven gear 16. Also, when the second speed is set by means of engaging the second speed driven gear 17 with the output shaft 8 with operating the synchronizing mechanism 25, the torque of the input shaft 7 is transmitted to the output shaft 8 through the second speed drive gear 11 and the second speed driven gear 17.

Moreover, when the third speed is set by means of engaging the third speed drive gear 12 with the input shaft 7 with operating the synchronizing mechanism 23, the torque of the input shaft 7 is transmitted to the output shaft 8 through the third speed drive gear 12 and the third speed driven gear 18. Furthermore, when the fourth speed is set by means of engaging the fourth speed drive gear 13 with the input shaft 7 with operating the synchronizing mechanism 23, the torque of the input shaft 7 is transmitted to the output shaft 8 through the fourth speed drive gear 13 and the fourth speed driven gear 19.

Still moreover, when the fifth speed is set by means of engaging the fifth speed drive gear 14 with the input shaft 7 with operating the synchronizing mechanism 24, the torque of the input shaft 7 is transmitted to the output shaft 8 through the fifth speed drive gear 14 and the fifth speed driven gear 20. Also, in case of shifting the gear stage, the engine torque is lowered according to the necessity and the torque capacity of the control clutch 2 is also lowered in order to operate the synchronizing mechanism smoothly, then the speed change is executed, and subsequently the torque capacity of the clutch 2 is increased and the control for increasing the engine torque is executed. In case of controlling the engine output (torque×the number of revolution), at least one of the following controls is executed, such as a control of volume of intake air, a control of ignition timing, or a control of fuel injection quantity.

In case that a reverse position is selected, on the other hand, a reverse gear stage is set with engaging the reverse driven gear 21 with the intermediate gear 22. Consequently, the torque of the input shaft 7 is transmitted to the output shaft 8 through the reverse drive gear 15, the intermediate gear 22, and the reverse driven gear 21. As a matter of course, directions of revolution of the output shaft 8 at the forward gear stage is opposite to that at the reverse gear stage.

When the engine torque is thus transmitted to the output shaft 8 through the input shaft 7, the torque is then transmitted to both right and left wheels 5 through the differential 4 and the drive shaft 31. In this embodiment, a demand torque of the driver is decided based on the vehicle speed and opening of the accelerator (i.e., driving condition), and the demand torques on the engine and on the second motor generator 35 are decided based on the decision result. Additionally, the vehicle Ve shown in this embodiment is so-called a hybrid vehicle which is capable of transmitting the torques of the engine 1 and the motor generator 35 to the same wheel 5.

A mode for controlling the engine torque in accordance with the aforementioned demand torque on the engine is described as a torque controlling mode. Also, a revolution controlling mode may be selected other than the torque controlling mode. An example of switching each mode will be described. For example, the torque controlling mode is selected before executing the gear shift of the transmission 3. Subsequently, when the gear shift is executed, the torque capacity of the clutch 2 is lowered prior to execute the gear shift. The gear shift of the transmission 3 is commenced when the clutch 2 is released, and the control mode of the engine 1 is shifted from the torque controlling mode to the revolution controlling mode. Namely, the engine 1 is controlled based on the engine speed calculated by the electronic control unit 45. Specifically, the engine speed is controlled so that the engine speed after a completion of the gear shift of the transmission 3 close to the revolution speed of the input shaft 7 after the completion of the gear shift.

Then, when the gear shift of the transmission 3 is completed and the actual engine speed reaches the engine speed after the completion of the gear shift, the revolution controlling mode shifts to the torque controlling mode again, and the torque capacities of the engine torque and the clutch 2 are increased. In order to prevent the lowering of the torque to be transmitted to the wheel 5 from the engine 1 at the shifting time of the transmission 3 and accompanying shock, the following control is executed.

At the shifting time of the transmission 3, the electric power is supplied to the second motor generator 35 so as to make it function as the electric motor, and the torque of the second motor generator 35 is transmitted to the wheel 5 through the power transmission shaft 38 and the differential 4. Consequently, lowering of the driving torque of the wheel 5 is suppressed, and the shock is thereby prevented. Here, the torque to be outputted from the second motor generator 35 is calculated based on a gear ratio of the transmission 3, a power loss until the engine torque is transmitted to the wheel 5 or the like.

Meanwhile, in case of assisting the driving torque of the transmission 3 at the shifting time by the output torque of the second motor generator 35, growing of the battery 43 in its size and capacity is suppressed by controlling the electric power to be supplied to the second motor generator 35 as mentioned below.

Figure 1:
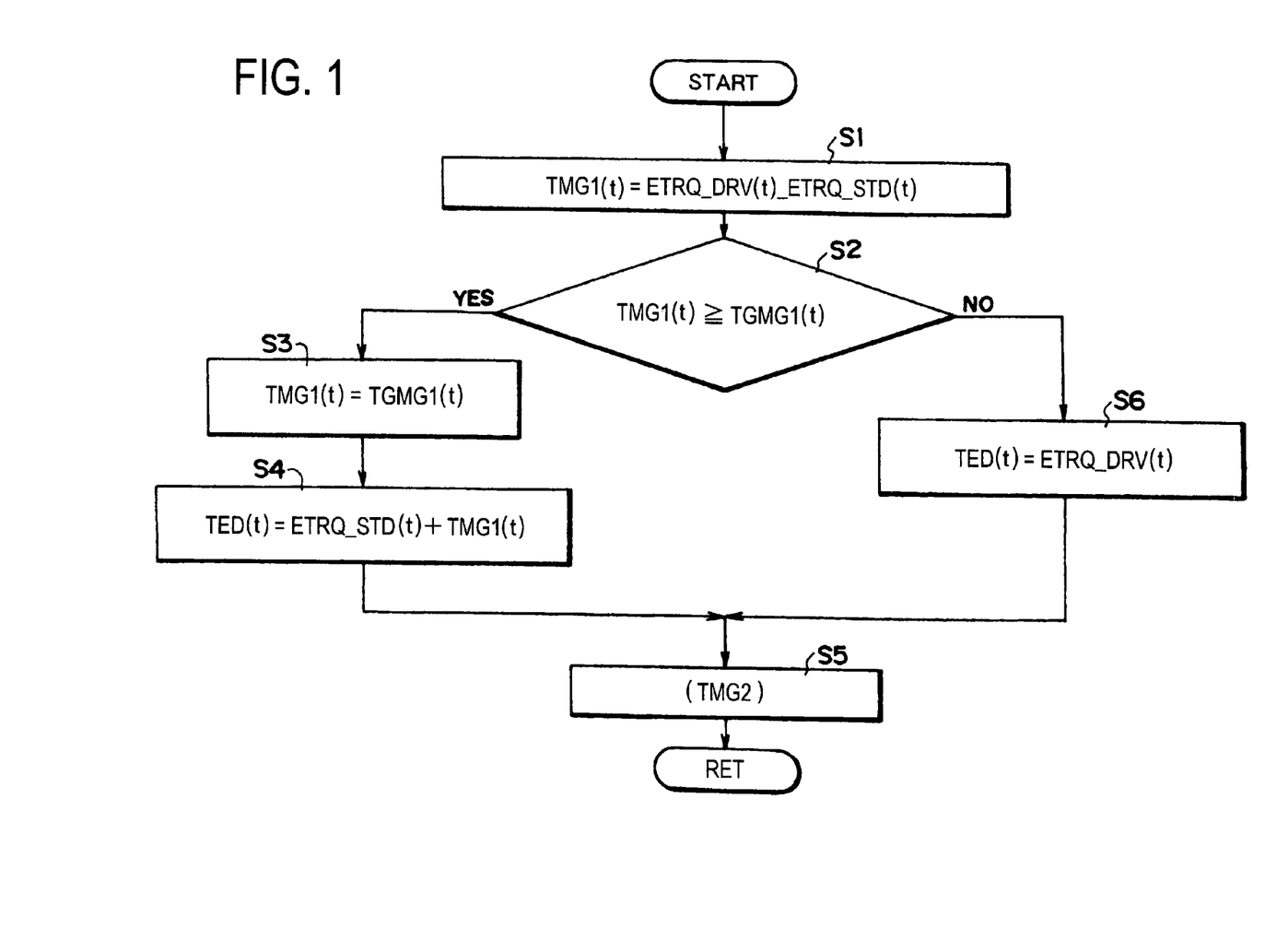
FIG. 1 is a flowchart showing an example of control to be executed in a control system according to the invention.

FIG. 1 is a flowchart explaining one example of the control. First of all, a regenerative torque of the first motor generator 34, in other words, a necessary generation of the electric power for the first motor generator 34 is calculated (Step S1). Here, the regenerative torque TMG(t) of the first motor generator 34 is governed by:

$$TMG1(t) = ETRQ\_DRV(t) - ETRQ\_STD(t)$$

where ETRQ_DRV(t) represents the demand torque of the driver calculated based on the vehicle speed, the opening of the accelerator and so on. Also, ETRQ_STD(t) represents the torque to be imposed on the engine 1. More properly, it is the engine torque to be lowered gradually so as to prevent a distortion in the transmission 3 and a shock due to the detorsion, and it used to be lowered to zero when the clutch is released in the prior art.

It is decided whether or not the regenerative torque TMG(t) of the first motor generator 34 calculated at aforementioned Step S1 is higher than an upper limit value (an upper limit guard value) TGMG1(t). Namely, it is decided whether or not:

$$TMG(t) \geq TGMG1(t)$$

(Step S2). Here, the upper limit value (an upper limit guard value) TGMG1(t) is a tolerated maximum value of the regenerative torque for the first motor generator 34. If the answer of Step S2 is YES, the regenerative torque TMG(t) of the first motor generator 34 is limited to the maximum value TGMG1(t), so that the regenerative torque TMG(t) of the first motor generator 34 under control is set to the maximum value TGMG1(t) (Step S3). Under this condition, the output torque of the engine 1 cannot be absorbed entirely by the first motor generator 34.

Next, torque TED to be demanded on the engine 1 is determined (Step 4). Namely:

$$TED(t) = ETRQ\_STD(t) + TMG(t)$$

is calculated.

Since the torque TMG(t) tolerated by the first motor generator 34 is smaller than the torque calculated at aforementioned Step S1, the torque to be transmitted from the engine 1 to the wheel 5 through the transmission 3 is lowered in order to reduce the distortion due to the torque which acts on both input and output sides of the transmission 3 during the course of the gear shift. Namely, the aforementioned torque ETRQ_STD(t) to be imposed on the engine 1 is lowered gradually in order not to cause the shock. Therefore, the demand torque TED(t) for the engine 1 is determined so as to output the torque which is the total of the torque ETRQ_STD(t) and the torque TMG(t) of the first motor generator 34. Accordingly, the demand torque TED(t) is lowered gradually during the course of the gear shift, and it is returned to the former torque when the gear shift is completed. The output torque of the engine 1 thus lowered during the course of the gear shift and returned to the former torque is the torque, which exceeds the torque absorbed by the first motor generator 34.

The first motor generator 34 is driven compulsorily and functions as the electric generator in cooperation with controlling the engine 1 so as to accomplish the aforementioned demand torque TED(1), and the electric power is supplied to the electric circuit A1 (Step S4). Namely, the electric power generated from the first motor generator 34 is supplied to the second motor generator 35, and the torque of the second motor generator 35 assists the driving torque. The assist of the driving torque by the second motor generator 35 is executed in accordance with the torque absorbed by the first motor generator 34, or with lowering of the output torque of the engine 1.

Specifically, a demand torque TMG2(t) on the second motor generator 35 is calculated (Step S5), and the second motor generator 35 is controlled on the basis of the calculation result. The electric power in this case is the electric power generated from the first motor generator 34. Besides, the demand torque on the second motor generator 35 is calculated on the basis of the gear ratio of the transmission 3, the power loss until the engine torque is transmitted to the wheel 5 or the like.

If the answer of the aforementioned Step S2 is NO, the demand torque TED(t) on the engine 1 is set to the demand torque ETRQ_DRV(t) of the driver (Step S6). Namely, it is maintained as the torque prior to the commencement of the gear shift. Subsequently, the routine advances to Step S5. That is, in this case, electric power generation may be executed by absorbing the overall output torque of the engine 1, and the necessary driving torque may be outputted by driving the second motor generator 35 with the generated electric power. Therefore, the demand torque TED(t) on the engine 1 is kept as the demand torque ETRQ_DRV(t) of the driver without executing the control for lowering the engine torque, even at the shifting time.

The control of each of the aforementioned step is executed by the electronic control unit 45. Accordingly, the function of the electronic control unit 45 for executing the aforementioned Step S2 corresponds to a decision means of the present invention; the function of the electronic control unit 45 for executing aforementioned Step S5 corresponds to a torque controlling means of the present invention; and the function of the electronic control unit 45 for executing aforementioned Step S6 corresponds to a torque maintaining means of the present invention.

Figure 4:
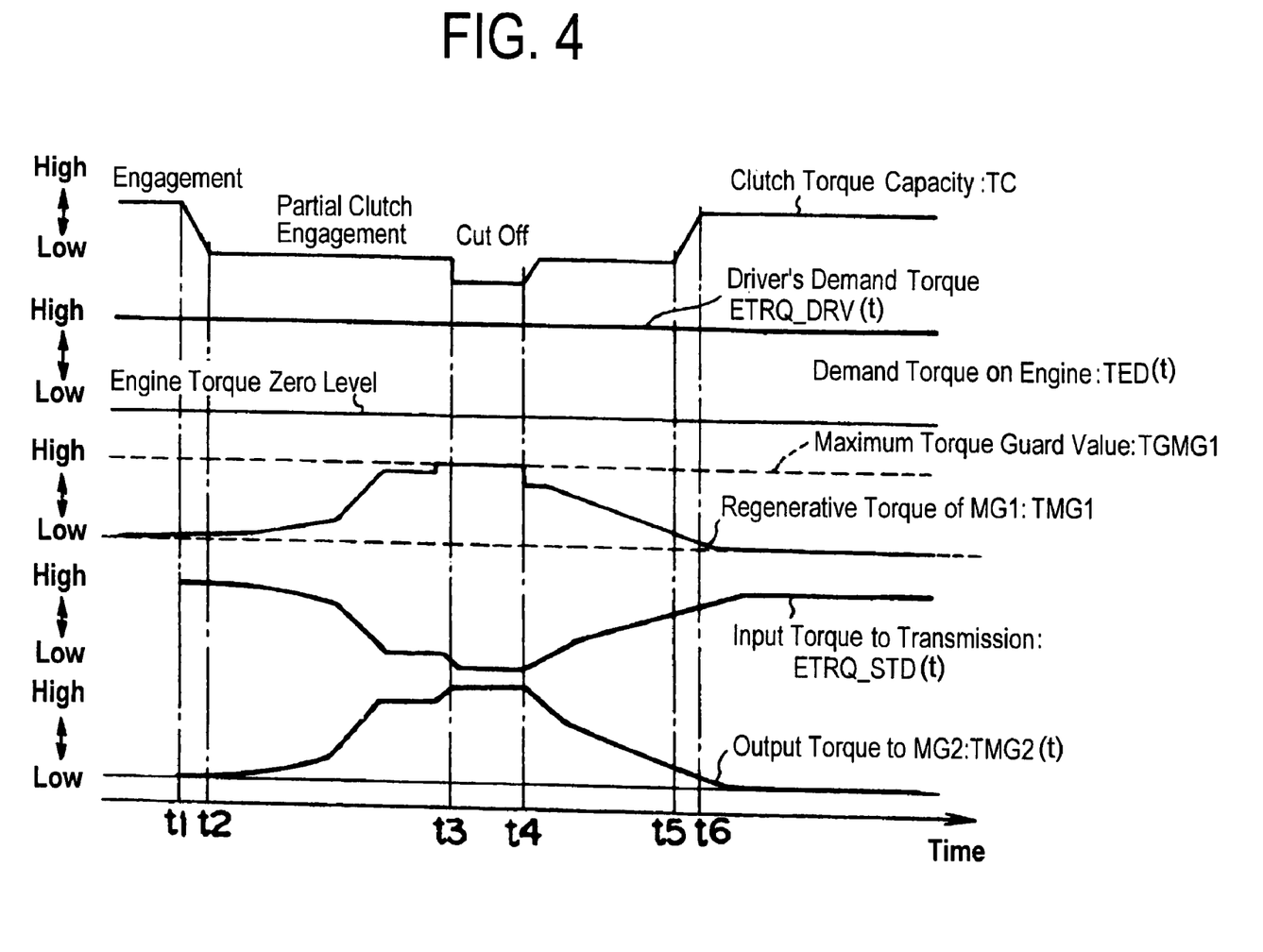
FIG. 4 is a diagram showing one example of a time chart in case the control of FIG. 1 is executed.
Figure 5:
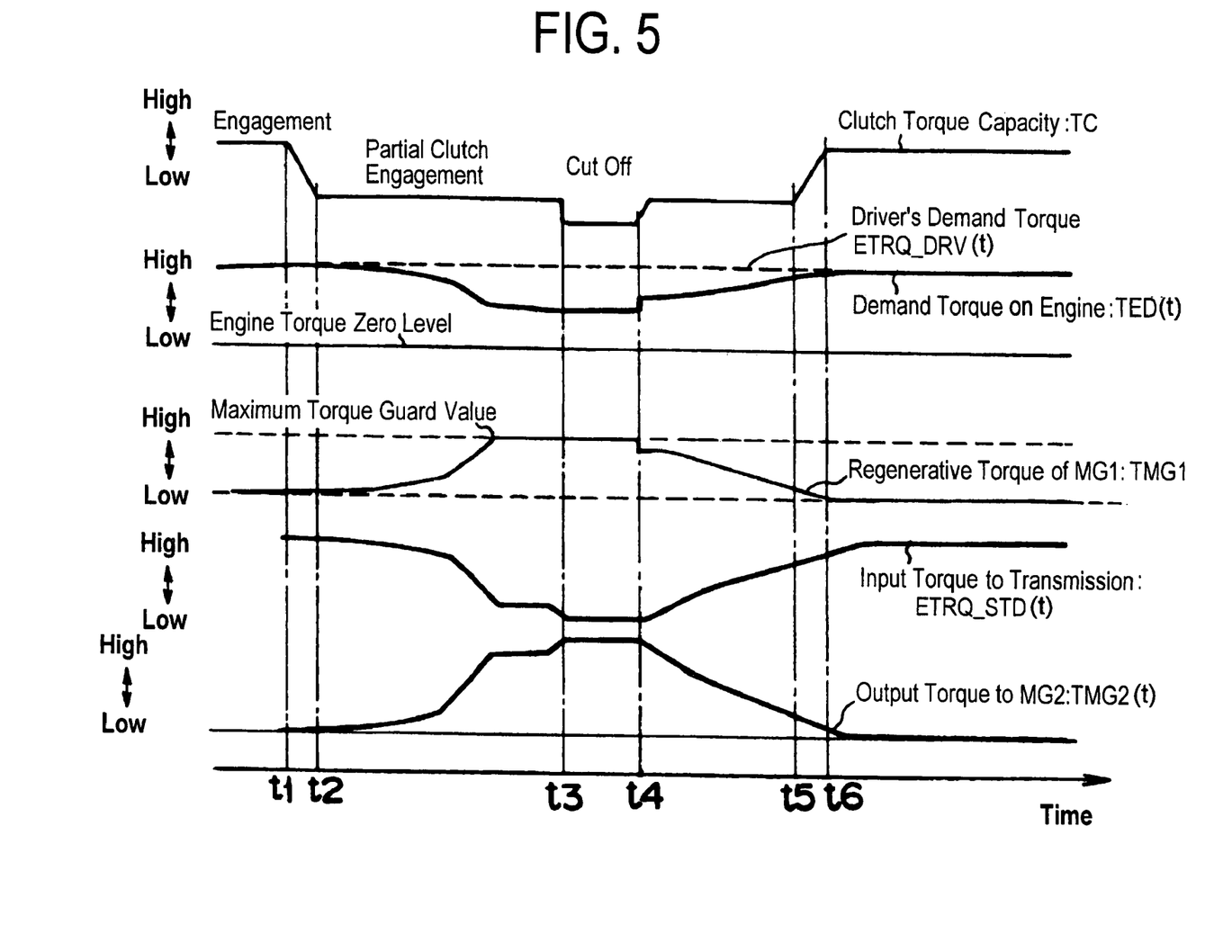
FIG. 5 is a diagram showing another example of a time chart in case of the control of FIG. 1 is executed.

An example of a time chart in case of executing the aforementioned control is shown in FIGS. 4 and 5. The example shown in FIGS. 4 and 5 is the example such that the demand torque ETRQ_DRV(t) of the driver is constant before as well as after the gear shift. Also, the example shown in FIG. 4 is the example such that the answer of the Step S2 is NO, i.e., the case such that the regenerative torque which is possible to be generated from the first motor generator 34 is sufficiently big. The example shown in FIG. 5 is the example such that the answer of the Step S2 is YES, i.e., the case such that the regenerative torque which is possible to be generated from the motor generator 34 is small.

First, in FIG. 4, the clutch is engaged prior to the generation of the gear shift demand, and demand torque of the driver and the demand torque on the engine are generally equal. Also, the regenerative torque of the first motor generator is controlled to be the predetermined low torque (zero). Moreover, the torque to be inputted from the engine to the transmission is the torque necessary for running, and is set to the predetermined high torque. Still moreover, the output torque of the second motor generator (i.e., an assist torque) is controlled to be the predetermined low torque (zero).

Then, when the gear shift demand is generated, the torque capacity Tc of the clutch is lowered from the time t1, and the regenerative torque of the first motor generator is increased. Although the demand torque on the engine is not lowered, the torque capacity Tc of the clutch is lowered; therefore, the torque to be inputted from the engine to the transmission is lowered. Moreover, the assist torque of the second motor generator is increased gradually so as to compensate for the driving torque in connection with the lowering of the torque capacity Tc of the clutch. The electric power is the electric power generated from the first motor generator 34.

The clutch is engaged partially after the time t2, and the clutch slips. In the process of this, the regenerative torque of the first motor generator is increased, and the input torque to the transmission is gradually lowered in connection with this. The torque of the second motor generator is increased gradually in addition to this, so that the driving torque will not be lowered.

Moreover, the clutch is released at the time t3 when the input torque to the transmission is sufficiently lowered, and the input torque to the transmission becomes zero. After that, the gear shift is executed. Also, the regenerative torque of the first motor generator becomes maximum, and the output torque of the second motor generator becomes maximum. Furthermore, the torque capacity Tc of the clutch is increased gradually and the status becomes partial engagement after the time t4 when the gear shift is completed, and the torque to be inputted to the transmission is thereby increased.

Besides, the regenerative torque of the first motor generator starts reducing, so that the torque to be inputted to the transmission through the clutch is gradually increased. Additionally, the output torque of the second motor generator is lowered gradually. Since there is no or little possibility of a change in revolution caused by a change in the torque capacity Tc of the clutch, i.e., generation of an inertia torque, the torque capacity Tc is increased in comparison with the partial engagement status and the clutch is engaged at the time t6. Also, the torque to be inputted to the transmission returns to a high torque, the regenerative torque of the first motor generator becomes zero, and the output torque of the second motor generator becomes also zero.

On the other hand, according to the example shown in FIG. 5, the torque outputted from the engine is partially transmitted to the wheel 5 via the transmission; therefore, the demand torque on the engine is changed. Namely, the demand torque on the engine is lowered after the time t2. This is to lower the torque to be inputted to the transmission from the engine side. And the regenerative torque of the first motor generator reaches the upper limit value before the time t3. Concerning the period at which the regenerative torque of the first motor generator becomes maximum, the case in FIG. 5 is earlier in comparison with the case in FIG. 4.

The torque to be transmitted to the transmission from the engine through the clutch is generated due to the restriction of the torque to be regenerated by the first motor generator. However, the torque is lowered gradually due to lowering of the demand torque on the engine, and the torque becomes almost zero at the time t3. Accordingly, the gear shift is executed under this. condition. Specifically, any of the aforementioned synchronizing mechanism is shifted. Accordingly, the shifting operation is executed smoothly.

Then, the demand torque on the engine is increased after the time t4 when the shifting of the synchronizing mechanism is almost done, and the demand torque of the driver and the demand torque on the engine become generally equal at the time t6. Here, in FIG. 5, the torque capacity Tc of the clutch, the input torque to the transmission, and the output torque of the second motor generator change similarly to the example shown in FIG. 4.

Thus, according to the control example in FIG. 1, in case of executing the gear shift by the transmission 3 with lowering the torque capacity Tc of the clutch 2, together with transmitting the torque, of the second motor generator 35 to the wheel 5, the electric power is generated by means of transmitting the torque of the engine 1 to the first motor generator 34, and the generated electric power is supplied to the electric circuit A1. Namely, the electric power generated from the first motor generator 34 drives the second motor generator 35, and its torque assists the driving torque.

Accordingly, the electric power of the battery 43 is not used for assisting the torque at the shifting time, or the quantity consumed is rather small, so that the growing of the battery 43 in its size and capacity may be suppressed, and the inexpensive battery may be employed for the battery 43. Also, the engine torque is absorbed by the first motor generator 34, so that the transmission of the engine torque may be suppressed more certainly.

Besides, although the battery is shown in FIG. 2 as the electric accumulator device (i.e., secondary battery), the present invention may be applied to a vehicle in which a capacitor is employed instead of the battery. Moreover, according to the power train in FIG. 2, it is constructed to transmit the torque of the engine 1 and the second motor generator 35 to the same wheel (front wheel) 5; however, the present invention may be applied to a control device intended for the vehicle having a power train which is constructed to transmit the torque of a prime mover and the electric power generator to rear wheels.

Furthermore, the present invention may be applied to a control device intended for the vehicle having a power train which is constructed to transmit the torque of a prime mover and the electric motor to different wheels. For instance, the present invention may be applied to a control device intended for the vehicle having a power train which is constructed to transmit the torque of a prime mover to the front wheel, and to transmit the torque of the electric motor to the rear wheel, or a power train to transmit the torque of a prime mover to the rear wheel and to transmit the torque of the electric motor to the front wheel. Still moreover, according to the power train in FIG. 2, it is constructed to decide the gear shift by the electronic control unit 45, and to execute the gear shift of the transmission 3 by the first actuator 9; however, the present invention may be applied to a vehicle having a transmission which is constructed to execute the shifting of the gear stage of the transmission by an operation of the driver.

Here will be synthetically described the advantages to be attained by this invention. According to the present invention, when transmitting the motive energy of the electric motor to the wheel, the electric power is generated by the motive energy of the prime mover, and the generated electric power may be supplied to the electric circuit connected to the electric motor; therefore, the electric power source for supplying the electric power to the electric motor may be small in its size and capacity.

Moreover, according to the present invention, because the torque of the prime mover is absorbed by the electric power generator, transmitting of the torque of the prime mover to the transmission may be suppressed more certainly.

What is claimed is:

1. A shift control system for a hybrid vehicle, comprising:
   a prime mover;
   a transmission;
   a clutch mechanism arranged between the prime mover and the transmission, a torque capacity of the clutch mechanism being lowered at a shifting time of the transmission;
   an electric motor that assists a driving torque at the shifting time;
   an electric power generator that generates an electric power by being driven by the prime mover at the shifting time of the transmission; and
   an electronic circuit that drives the electric motor to assist the driving torque at the shifting time by supplying the electric power generated from the electric power generator at the shifting time of the transmission.

2. The shift control system according to claim 1,
wherein the electric power generator is connected with the prime mover without the clutch mechanism interposed therebetween.

3. The shift control system according to claim 1, further comprising:
a controller that controls the electric power generator to absorb the torque generated from the prime mover at the shifting time of the transmission by the electric power generator.

4. The shift control system according to claim 3,
wherein the controller is constructed to control the torque of the electric power generator so that a torque to be inputted to the transmission from the prime mover through the clutch mechanism becomes zero at the shifting time of the transmission.

5. The shift control system according to claim 1, comprising:
a controller that controls the electric power generator so as to absorb the torque generated from the prime mover at the shifting time of the transmission by the electric power generator, and for controlling the electric motor so as to have the electric motor output the torque in accordance with the torque absorbed by the electric power generator.

6. The shift control system according to claim 1, further comprising:
a controller that controls the electric power generator so as to absorb a part of the torque generated from the prime mover at the shifting time of the transmission by the electric power generator, and controls an output torque of the prime mover so that the torque exceeding that to be absorbed by the electric power generator becomes zero.

7. The shift control system according to claim 1, further comprising:
a controller that controls the electric power generator so as to absorb a part of the torque generated from the prime mover at the shifting time of the transmission by the electric power generator, controls the output torque of the prime mover so that an another part of the torque generated from the prime mover becomes zero, and controls the output torque of the electric motor in accordance with the torque absorbed by the electric power generator and the output torque of the prime mover.

8. The shift control system according to claim 1,
wherein the transmission comprises, a plurality of gear pairs, and a plurality of synchronizing mechanisms that gears the plurality of gear pairs with an input shaft and an output shaft selectively.

9. The shift control system according to claim 1, further comprising:
a decision means for deciding that it is possible to absorb the entire torque outputted from the prime mover by the electric power generator at the shifting time of the transmission, and
a torque maintaining means for maintaining the output torque of the prime mover as the torque before a commencement of a gear shift, when the decision means decides that it is possible to absorb the entire torque outputted from the prime mover by the electric power generator at the shifting time of the transmission.

10. The shift control system according to claim 1, further comprising:
a decision means for deciding that it is possible to absorb the entire torque outputted from the prime mover by the electric power generator at the shifting time of the transmission, and
a torque controlling means for controlling the output torque of the prime mover so that the torque exceeding that possible to be absorbed by the electric power generator gradually becomes zero, when the decision means decides that it is not possible to absorb the entire torque outputted from the prime mover by the electric power generator at the shifting time of the transmission.

11. A shift control system for a hybrid vehicle, comprising:
a prime mover;
a transmission;
a clutch mechanism arranged between the prime mover and the transmission, a torque capacity of the clutch mechanism being lowered at a shifting time of the transmission;
an electric motor that assists a driving torque at the shifting time;
an electric power generator that generates an electric power by being driven by the prime mover at the shifting time of the transmission; and
an electronic circuit that drives the electric motor to assist the driving torque at the shifting time by supplying the electric power generated from the electric power generator at the shifting time of the transmission,
wherein the electric power generator is connected with the prime mover at a side of the prime mover opposite to a side of the prime mover at which the clutch mechanism is located.

12. A shift control system for a hybrid vehicle, comprising:
a prime mover;
a transmission;
a clutch mechanism arranged between the prime mover and the transmission, a torque capacity of the clutch mechanism being lowered at a shifting time of the transmission; and
an electric motor that assists a driving torque at the shifting time;
an electric power generator that generates an electric power by being driven by the prime mover at the shifting time of the transmission; and
an electronic circuit that drives the electric motor to assist the driving torque at the shifting time by supplying the electric power generated from the electric power generator at the shifting time of the transmission,
wherein the electric power generator is directly connected with the prime mover.

* * * * *